United States Patent
Krig et al.

(10) Patent No.: US 9,118,718 B2
(45) Date of Patent: Aug. 25, 2015

(54) TECHNIQUES TO MONITOR CONNECTION PATHS ON NETWORKED DEVICES

(75) Inventors: Scott A. Krig, Santa Clara, CA (US); Madan Venugopal, Cupertino, CA (US); Vishwa Hassan, Chandler, AZ (US)

(73) Assignee: INTEL CORPORATION, Santa Clara, CA (US)

(*) Notice: Subject to any disclaimer, the term of this patent is extended or adjusted under 35 U.S.C. 154(b) by 72 days.

(21) Appl. No.: 13/977,001

(22) PCT Filed: Apr. 10, 2012

(86) PCT No.: PCT/US2012/032842
§ 371 (c)(1),
(2), (4) Date: Jun. 27, 2013

(87) PCT Pub. No.: WO2013/154532
PCT Pub. Date: Oct. 17, 2013

(65) Prior Publication Data
US 2014/0201528 A1    Jul. 17, 2014

(51) Int. Cl.
  H04L 12/26 (2006.01)
  H04L 29/06 (2006.01)
  H04L 29/08 (2006.01)
  H04L 9/32 (2006.01)
  H04L 29/12 (2006.01)

(52) U.S. Cl.
  CPC ............ H04L 63/164 (2013.01); H04L 9/3263 (2013.01); H04L 43/0811 (2013.01); H04L 61/1511 (2013.01); H04L 63/0236 (2013.01); H04L 63/10 (2013.01); H04L 67/22 (2013.01)

(58) Field of Classification Search
  CPC .................................... H04L 63/0227–63/0263
  See application file for complete search history.

(56) References Cited

U.S. PATENT DOCUMENTS

| | | |
|---|---|---|
| 2006/0200659 A1* | 9/2006 | Gillum .......................... 713/151 |
| 2007/0101144 A1 | 5/2007 | Owen et al. |
| 2007/0180495 A1* | 8/2007 | Hardjono et al. ................. 726/3 |
| 2007/0217344 A1* | 9/2007 | Krywaniuk .................... 370/254 |
| 2008/0291827 A1* | 11/2008 | Xiong et al. ............... 370/230.1 |
| 2009/0013399 A1 | 1/2009 | Cottrell et al. |
| 2011/0167162 A1 | 7/2011 | Ishida et al. |
| 2011/0317631 A1* | 12/2011 | Navda et al. .................. 370/329 |
| 2012/0005387 A1 | 1/2012 | Sedayao et al. |
| 2012/0039452 A1 | 2/2012 | Horn et al. |
| 2012/0089700 A1* | 4/2012 | Safruti et al. ................. 709/217 |

OTHER PUBLICATIONS

International Search Report and Written Opinion received for PCT Patent Application No. PCT/US2012/032842, mailed Aug. 12, 2013, 12 pages.

* cited by examiner

Primary Examiner — Gilberto Barron, Jr.
Assistant Examiner — Arya Golriz
(74) Attorney, Agent, or Firm — Kacvinsky Daisak Bluni PLLC (57) ABSTRACT

Techniques for managing network connections are described. An apparatus may comprise a communications component operative to manage a connection for a client, the connection routed over a network and a traffic analysis component operative to determine one or more characteristics of the routing of the connection. Other embodiments are described and claimed.

20 Claims, 6 Drawing Sheets

MANAGING A CONNECTION FOR A CLIENT, THE
CONNECTION ROUTED OVER A NETWORK
202

DETERMINING ONE OR MORE CHARACTERISTICS OF THE
ROUTING OF THE CONNECTION
204

DETERMINING WHETHER TO BLOCK THE CONNECTION
BASED ON THE ONE OR MORE DETERMINED
CHARACTERISTICS
206

TECHNIQUES TO MONITOR CONNECTION PATHS ON NETWORKED DEVICES

BACKGROUND

Internet communication is increasingly replacing the use of older communications technology, such as the mail or the telephone, while also creating additional means of communication. However, this transition has often resulted in users losing an awareness of with whom they are communicating and therefore losing an ability to control with whom or with where they communicate. Further, the digital transmission of information through servers and network relays has created new opportunities for eavesdropping, increasing the importance of the path along which communication travels. Traditional telephone services such as Caller Identification (ID) allow for a user of a traditional telephone to see the identity or location of an incoming caller before answering the phone. In contrast, a user whose device receives an incoming network connection over networks such as internet, text messaging, email, and the like, may be told nothing about the identity or location of the source of the connection. This denies users the ability to monitor and control what people in what locations are allowed to initiate communication with them. It is with respect to these and other considerations that the present improvements are needed.

DETAILED DESCRIPTION

Various embodiments are directed to techniques for verified, approved, and monitored connection paths for networked devices. Internet users often have little direct control or knowledge over the network connections that are initiated or received by their client computer. While a user initiating a connection to a web site may have some concept of the individual, corporation, or other entity that is nominally the source of the site, the actual computer infrastructure used to host the site and transmit the data to and from the site may be entirely opaque to the user. A single web page may contain content hosted on a number of different servers, which may perform different functions: providing textual content, providing image content, providing advertisements, providing embedded content, performing IP-based user tracking, performing cookie-based user tracking, or any other task which may be achieved through a web site.

As such, while a user may conceive of requesting a web page as initiating a transaction with a singular entity—the individual, corporation, or other entity associated with the site—they may in fact be in communication with several or dozens of entities, which may be geographically distributed across the world. A user who wishes to avoid communicating with a particular entity or location may, therefore, find themselves unable to successfully implement this desire due to their inability to monitor and control with whom they communicate. An individual may wish to avoid communication with a particular entity or location (such as a country) for any reason—moral, ethical, legal, for the sake of privacy, etc.—or may simply wish to be aware of with whom they communicate. Nor is this issue specific to web pages. Instant messaging, video streaming, teleconferencing or any other suitable form of Internet communication may involve either communicating with, or having ones communication routed through, an entity or location that a user wishes to avoid.

Therefore, the enclosed embodiments are generally directed to providing users with enhanced information about whom they communicate with, what locations or countries their communication originates from or travels through, and the ability to block communication that is with or routed through particular, user-specified undesirable entities or locations. As a result, the embodiments can improve the control users have over their communication and the knowledge they have of their network (e.g., Internet) usage.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

Figure 1:
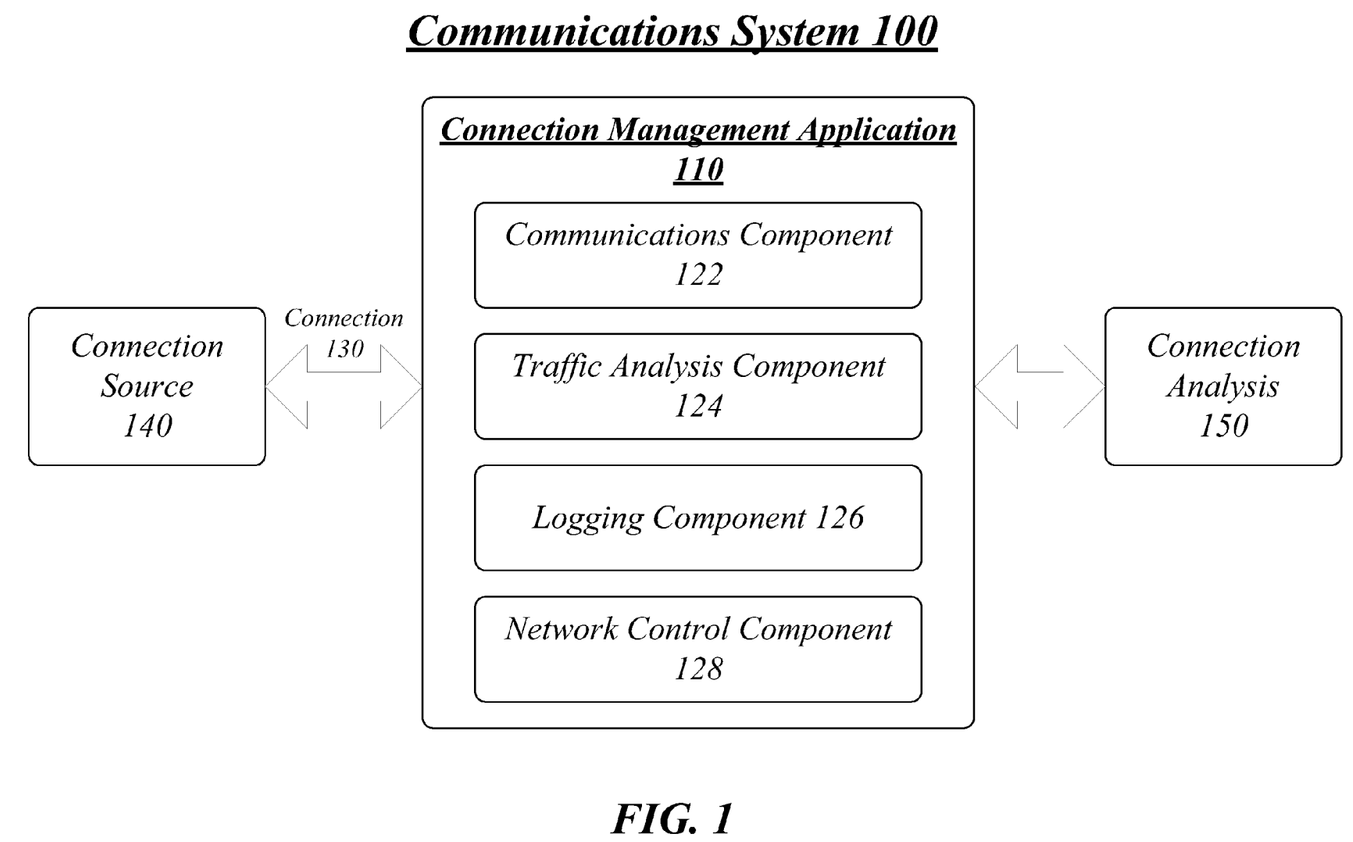
FIG. 1 illustrates an embodiment of a communications system for managing network connections.

FIG. 1 illustrates a block diagram for a communications system 100. In one embodiment, the communications system 100 may comprise a computer-implemented communications system 100 having a connection management application 110 comprising one or more components: a communications component 122 operative to manage a connection 130 for a client, the connection 130 routed over a network, a traffic analysis component 124 operative to determine one or more characteristics of the routing of the connection 130, a logging component 126 operative to create a record in a log of network traffic of the one or more characteristics, and a network control component 128 operative to determine whether to block the connection 130 based on the one or more determined characteristics. Although the communications system 100 shown in FIG. 1 has a limited number of elements in a certain topology, it may be appreciated that the communications system 100 may include more or less elements in alternate topologies as desired for a given implementation.

The communication systems 100 may comprise the connection management application 110. The connection management application 110 may be generally arranged to manage network communications for a client device and/or user. In particular, the connection management application 110 may be arranged to analyze incoming and outgoing network connections, to determine characteristics of the connections, to communicate these characteristics to a user in a manner designed to empower the user to make informed decisions about their network connections, and to provide users with the ability to control incoming and outgoing network connections using real-time controls, pre-established rules, or a combination of the two. The connection management application 110 may comprise a software application running on a client device, such as a desktop PC, laptop, smartphone, mobile device, or any other client device capable of communication using the Internet. The connection management application 110 may comprise a service, such as a cloud service, and may therefore be implemented on one or more servers acting as a proxy for a client device.

The connection management application 110 may comprise a communications component 122. The communications component 122 may be generally arranged to manage a connection 130 for a client, the connection 130 routed over a network. In various embodiments, the communications component 122 may comprise a cloud server acting as a network proxy for the client. In some embodiments, the communications component 122 may comprise an application running on a client device. In various embodiments, the communications component 122 may be integrated with the network stack of a cloud server or client device in order to empower the communications component 122 to perform network communications management tasks. Managing a connection may comprise, in various embodiments: initiating a connection 130, receiving a request to initiate a connection 130 from a connection source 140, receiving and queuing data received over a connection 130, and blocking a connection 130. In some embodiments, blocking a connection 130 may comprise rejecting or ignoring any data received over a connection 130. In some embodiments, blocking a connection 130 may comprise sending a message to the connection source 140 indicating that the connection 130 has been blocked.

The connection management applications 110 may comprise a traffic analysis component 124. The traffic analysis component 124 may be generally arranged to determine one or more characteristics of the routing of the connection. These characteristics may comprise information about the connection source 140 or any of the one or more entities through which the connection 130 is routed. These characteristics may comprise a name, country, street address, Internet Protocol (IP) address, service provider, domain name, physical location, GPS coordinates, a type of traffic (e.g. text, binary, encrypted, video, images), a quantity of traffic, and a duration of the connection. In various embodiments, the traffic analysis component 124 may be operative to perform a unified analysis of a plurality of connections wherein each of the plurality of connections is associated with a particular client network application or network task, such as a web browser or the loading of a web page. Specifically, the traffic analysis component 124 may be operative to determine a plurality of characteristics corresponding to a plurality of entities associated with the hosting of a web page, such as characteristics corresponding to the plurality of entities hosting the elements of the web page and the plurality of entities responsible for the routing of the connection 130.

The one or more characteristic can be determined in a variety of ways according to a variety of techniques. In some embodiments, these techniques may comprise one or more of running a traceroute method or similar algorithm to determine the routing points of the connection (e.g. the intermediate gateway and relay point locations of the connection), performing a domain name server lookup of the connection source 140, or examining the data payloads of the connection 130 to determine the type of data carried by the connection 130. In some embodiments, this may comprise examining a hypertext markup language (HTML) or multipurpose internet mail extension (MIME) encoding of data, which may contain one or more data fields indicating a data type. It will be appreciated that these techniques can be combined to determine information that would not be determined by any one being used alone. For example, the traffic analysis component 124 may be operative to run a traceroute method or similar algorithm on the connection 130 or connection source 140 so as to determine the routing points of the connection 130, such as the intermediate gateway and relay point locations, and receive as a result an ordered list of internet protocol (IP) addresses comprising a route from the connection source 140 to the connection management application 110 of the communication system 100. The traffic analysis component 123 may then perform a reverse domain name server lookup on each IP address of the list of IP addresses in order to determine characteristics of each of the routers along the path from the connection source 140 to the communications system 100. These characteristics may include the street addresses of the connection source 140 and each of the routers along the path, which may be converted into a standardized form for logging, presentation to a user, or comparison to a set of rules (e.g., whitelist or blacklist). For example, the street addresses may be converted into global positioning system (GPS) coordinates precisely describing the physical location of the connection source 140 and each router along the path.

The connection management application 100 may comprise a logging component 126. The logging component 126 may be arranged to create a record in a log of network traffic of the one or more characteristics determined by the traffic analysis component 124. The log may be maintained based on a connection, device, user, location, connection source, connection destination, and so forth.

The connection management application 100 may comprise a network control component 128. The network control component 128 may be arranged to determine whether to block the connection 130 based on the one or more determined characteristics. Any of the determined characteristics may be used as the basis of a decision to block or not to block. The user of the connection management application 110 may be operative to specify one or more rules which indicate that a connection 130 should be blocked if the one or more determined characteristics conform to the settings of the rule. For example, one or more rules may specify that a connection 130 is to be blocked if any of the physical locations that may comprise the one or more determined characteristics corresponds to a set of blacklisted physical locations. In various embodiments, physical locations may comprise a list of countries. As such, in some embodiments, the connection may be blocked if the determined characteristics indicate that the connection 130 was routed through a country included in a set of blacklisted countries.

In various embodiments, the network control component 128 may be operative to present a user of the connection management application 110 with a user interface view containing a query that an incoming connection 130 has been received and that the user may decide to either allow or block the connection 130. In some embodiments, this query may be avoided if the determined characteristics of an incoming connection 130 match one or more whitelist rules which specify that connections matching those rules should be automatically allowed. In this manner, a user may be able to specify that certain characteristics (such as physical locations) result in a connection 130 being blocked, that certain characteristics result in a connection 130 being automatically allowed, and that any other connection 130 results in the user being queried to determine whether the connection 130 should be allowed or blocked. As such, whether or not a user is presented with one or more of the determined characteristics and whether or not a user is queried as to whether a connection 130 should be blocked may itself be determined by the determined characteristics. It will be appreciated that this same technique may be applied to outgoing connections, particularly as computer devices may initiate a large number of connections in response to a user action—such as opening a web page—that would not be immediately apparent to the user.

In various embodiments, querying the user may comprise presenting the user—such as through a textual or graphical display—one or more of the determined one or more characteristics. For example, a user may be presented with an entity name, device name and physical location associated with the connection source 140. Alternatively or additionally, a user may be presented with a graphical rendering of a multi-hop map of the physical locations through which a connection 130 is routed. In some embodiments, the user may be able to specify which characteristics of the one or more characteristics they wish to be presented with when queried as to whether a connection 130 should be blocked.

In some embodiments, the network control component 128 may be specifically operative to individually determine whether to block or allow each of a plurality of connections 130 that are associated with the performance of a single user request, such as a user request to a web browser to visit a web page. In some embodiments, connections to the server or servers corresponding to a uniform resource locator (URL) of the web page may be automatically allowed as being the direct result of a user action, while any connections 130 to other servers are considered according to the rules of the network control component 128. In some embodiments, these rules may be conditional on the type of data being transmitted over the connections 130 or the purpose of the connections 130. For example, a connection 130 to a server hosting textual, image, video, or other media or multimedia content may be allowed unless the connection 130 has determined characteristics corresponding to a specific rule to block (such as a connection to or through a blacklisted country) while a connection 130 to a server acting as a tracking server—which attempts to track the behavior of individual computer users across multiple web pages or web sites—may be blocked, or the user may be asked whether to block, unless the tracking server or tracking servers appear on a whitelist of allowed tracking servers.

In various embodiments, one or more of a blacklist, whitelist, preference list, or other defined list may be used in analyzing and controlling the routing of a connection 130. A blacklist may comprise a listing of countries, regions, servers, networks, server operators, or network operators through which a connection 130 should not be routed and to which a connection 130 should not be routed. It will be appreciated that a blacklist may comprise any one of countries, regions, servers, networks, server operators, or network operators or may comprise a mix of blacklist entry types, and that one or more entries of each type may exist. In some embodiments, a blacklist may comprise a listing of regions through which a connection 130 should not be routed and to which a connection 130 should not be routed, where a region can comprise a defined physical area which may include countries, states, cities, or any other mechanism of defining a physical area. In some embodiments, a region may comprise a bounded geographical area comprising a cohesive political unit which may be one or more of a country, state, county, city, municipality, or any other form of political unit covering a defined geographical area.

A whitelist may comprise a listing of countries, regions, servers, networks, server operators, or network operators through which routing is authorized, such that a user does not need to give permission for any routing which would route a connection 130 through or to only entries on the whitelist. It will be appreciated that if a white list comprises only some of the listed types—for example, countries but not servers—then only those types of routing elements would need to appear on the whitelist for the connection to be allowed without user approval. In some embodiments, the network control component 128 may be operative to receive settings which define which elements of a routing—one or more of countries, regions, servers, networks, server operators, or network operators—must be compared to a whitelist, and may be further operative to receive the whitelist and to automatically authorize those and only those connections 130 wherein the instances of the specified elements in the routed connection appear on the whitelist, and to block or query a user regarding any other connection 130. For example, a user may specify to the network control component 128 that the whitelist is composed of countries and network operators and that any connection 130 which is only routed through and to a list of specific countries and network operators (the whitelist) may be automatically allowed, with any other connection 130 requiring specific user permission to allow.

A preference list may comprise a listing of desired countries, regions, servers, networks, server operators, or network operators through which routing is preferred but not required. Members of the preference list may also be automatically allowed for use during routing, but are also specifically desired for routing. These may represent particularly trusted routes. For example, a user in the United States may set a preference for routes which remain in the United States; a user in Western Europe may prefer routes which remain in Europe; a copyright holder may prefer routes which are entirely contained within countries that are signatories to one or more intellectual property treaties.

In some embodiments, the whitelist, blacklist, and preference list may be used with traditional network protocol methods, such as by having their control implemented using the tracrouting and domain name server (DNS) lookups as described above. In some embodiments, the whitelist, blacklist, and preference list may be implemented using an extended protocol allowing for the specification of one or more of a blacklist, whitelist, and preference list when attempting to initiate a connection 130 or send a packet, datagram, packet data unit (PDU), frame, subframe, or other unit of network transmission. For example, a request to open a network socket to a remote server may include within it a field specifying one or more of a whitelist, blacklist, and preference list for the routing of the connection 130, such that each intermediate step in the routing of the connection 130 is expected to adhere to the whitelist, blacklist, and/or preference list. In various embodiments, the user client may be operative to verify the obedience of the intermediate routing entities to the lists, such as through a query, or an encrypted query, to the intermediate routing entities to confirm their identity, existence on the whitelist, or lack of existence on the blacklist. In some embodiments, intermediate routing entities may be operative to query the user client to determine whether an entity (such as a country, region, server, network, server operator, or network operator) which is not on any of the whitelist, blacklist, or preference list is allowed. In some embodiments, the extended protocol may comprise an extension of the Internal Protocol (IP) protocol allowing for the specification of one or more of a blacklist, whitelist, and preference list in a IP datagram header. In other embodiments, the extended protocol may comprise an extension of a protocol at a different level of the network stack, such as one above or below the IP protocol. In some embodiments, the extended protocol may be used to re-check a connection path at intervals, such as at set intervals, or on demand, such as at a user request. It will be appreciated that any of the enclosed embodiments may be used at the instantiation of a connection, at the reception of an incoming connection, at the creation of an outgoing connection, or an existing connection.

In some embodiments, the user client may be operative to verify the identity or identifies of the destination and intermediate routing entities (such as a country, region, server, network, server operator, or network operator). This may comprise using an extension to the DNS protocol, such as by using a secure path DNS (SPDNS) protocol which is operative to retrieve from a SPDNS server a mapping list of cryptographically secure DNS entries mapped to IP addresses and one or more of country, region, server, network, server operator, or network operator, such as by using one or more identifiers uniquely corresponding to countries, regions, servers, networks, server operators, or network operators. In various embodiments, the mapping list may be cryptographically secured using public/private key cryptography, such as where a mapping list received by a client is encrypted using a private key maintained in secret and decrypted by the network client using a public key registered with a trusted authority. The SPDNS protocol may comprise a new protocol in the open systems interconnection (OSI) model of the network stack, such as a new protocol intended to replace or complement the existing DNS protocol. For example, a query to a SPDNS for a given domain name (e.g., a URL) may return the associated IP address and an associated country, the associated country being the country through which any communication would be routed if that domain name were included as part of a routing path. It will be appreciated that queries to the SPDNS may also be made using an IP address, such as the user client requesting location information for an IP address that appears as part of the routing of a connection being analyzed. In various embodiments, the user client may be operative to send to the SPDNS server a list of which identifying or location-based elements (such as a country, region, server, network, server operator, or network operator) it wishes to receive in response to a SPDNS lookup request.

In some embodiments, the SPDNS protocol may be used to negotiate with a network to determine a routing for a connection. For example, either the initiating endpoint or the destination endpoint of a connection may authenticate a SPDNS (such as by using public/private key cryptography) and accept or refuse proposed or attempted routing paths (such as actual attempts to route datagrams between the initiating endpoint and the destination endpoint or a routing path proposed by the SPDNS server) until the endpoint accepts a proposed or attempted routing path (such as by verifying its acceptability according to one or more of a whitelist, blacklist, or preference list using the SPDNS server). In some embodiments, the SPDNS protocol may comprise a common middleground for negotiating a connection between two endpoints. For example, the two endpoints of a connection may mutually authenticate each other (such as by using public/private key cryptography), and accept or refuse proposed or attempted routing paths (such as actual attempts to route datagrams between the endpoints or a routing path proposed by the SPDNS server) until both endpoints accept a proposed or attempted routing path (such as by verifying its acceptability according to one or more of a whitelist, blacklist, or preference list using the SPDNS server).

In some embodiments, a standardized icon may be used to communicate that a verified connection path (VCP) has been established for a connection. This may comprise a particular image or may comprise a standardized piece of text, such as "HTTP-VCP://" as a counterpart to the traditional "HTTPS://" indicating a secure connection, where HTTP refers to a "hypertext transfer protocol" and HTTPS refers to a "HTTP secure protocol." A user client may be operative to display the VCP icon when a connection with verified routing has been established according to the embodiments contained herein, and to not display the VCP icon when no such verified connection has been established. A user client may be operative to display an error message if an attempt to create a verified connection fails. A user client may be operative to display the icon in association with any connection that is a VCP, including displaying this icon multiple times on the same display, such as one instance associated with an email to indicate that the email was received over a VCP and another instance associated with a web page to indicate that the web page was received over a VCP.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
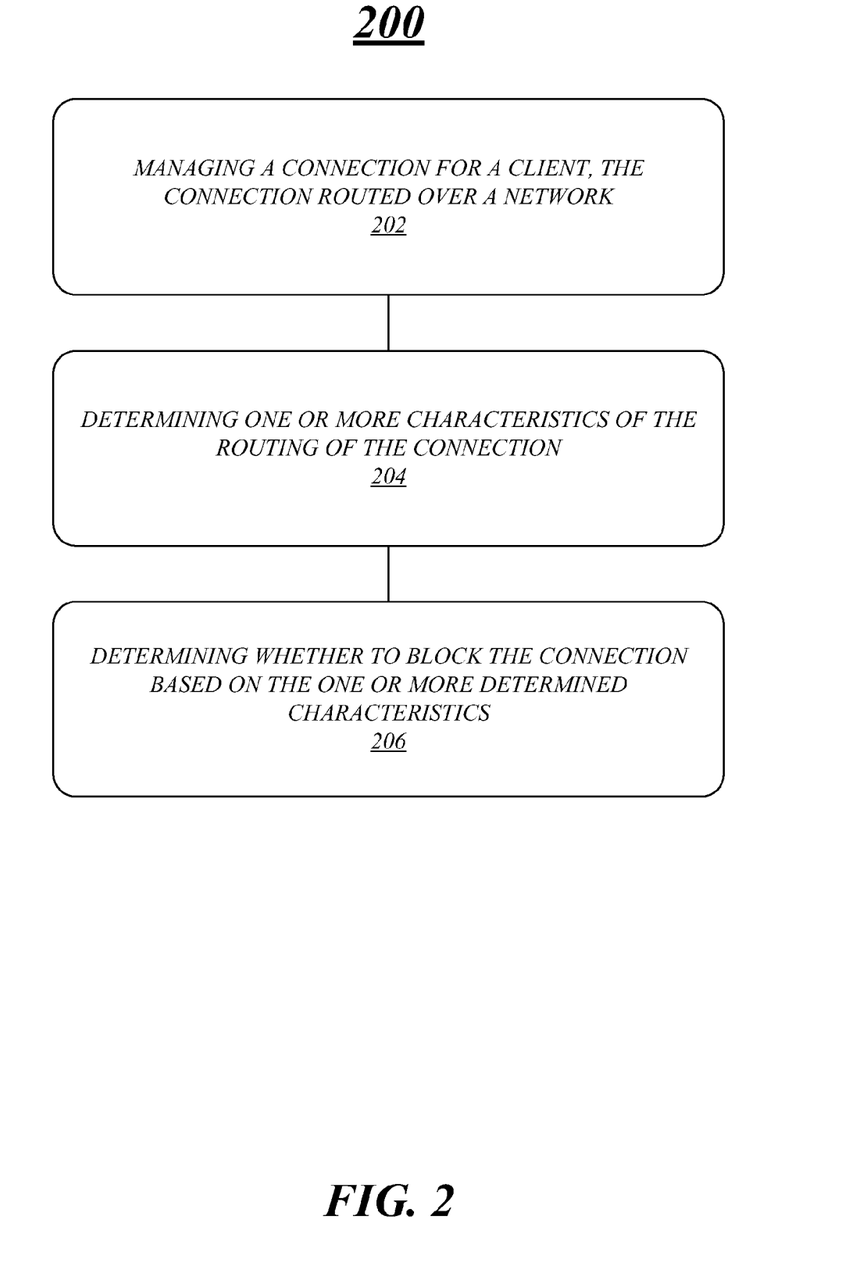
FIG. 2 illustrates an embodiment of a logic flow for the communications system of FIG. 1.

FIG. 2 illustrates one embodiment of a logic flow 200. The logic flow 200 may be representative of some or all of the operations executed by one or more embodiments described herein.

In the illustrated embodiment shown in FIG. 2, the logic flow 200 may begin at block 202. For example, block 202 may represent the first step in a procedure initiated at the initiation of any network connection 130 or at the receipt of any incoming network connection 130.

In block 202, a connection is managed for a client, the connection routed over a network. Managing a connection 130 may comprise, in various embodiments: initiating a connection 130, receiving a request to initiate a connection 130 from a connection source 140, receiving and queuing data received over a connection 130, and blocking a connection 130, or any other of the known techniques, methods, or actions involved with managing a connection 130.

In block 204, one or more characteristics of the routing of the connection are determined. These characteristics may comprise information about the connection source 140 or any of the one or more entities through which the connection 130 is routed. These characteristics may include without limitation a name, country, street address, Internet Protocol (IP) address, service provider, domain name, physical location, GPS coordinates, a type of traffic (e.g. text, binary, encrypted, video, images), a quantity of traffic, and a duration of the connection 130. In various embodiments, a unified analysis of a plurality of connections 130 may be performed wherein each of the plurality of connections 130 is associated with a particular client network application or network task, such as a web browser or the loading of a web page. Specifically, a plurality of characteristics may be determined corresponding to a plurality of entities associated with the hosting of a web page, such as characteristics corresponding to the plurality of entities hosting the elements of the web page and the plurality of entities responsible for the routing of the connection 130. As previously discussed, the one or more characteristic can be determined in a variety of ways according to a variety of techniques.

In block 206, whether to block the connection is determined based on the one more determined characteristics. In some embodiments, a connection 130 may be blocked if the determined physical location is part of a set of blacklisted physical locations. In some embodiments, a user may specify a set of rules, such that a connection 130 is blocked if the determined characteristics match one or more rules specifying that a connection 130 should be blocked on a match.

The embodiments are not limited to these examples.

Figure 3:
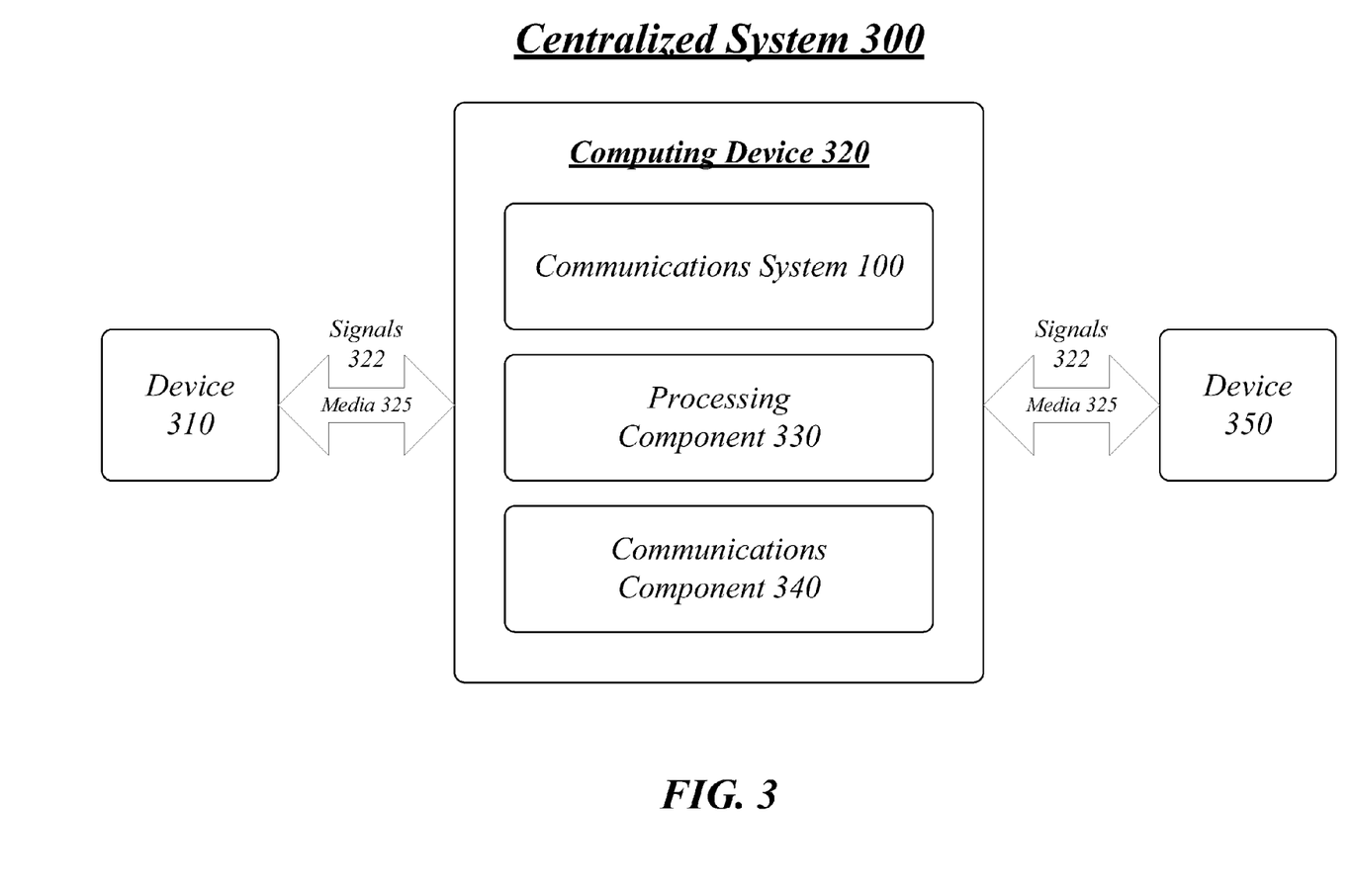
FIG. 3 illustrates an embodiment of a centralized system for the communication system of FIG. 1.

FIG. 3 illustrates a block diagram of a centralized system 300. The centralized system 300 may implement some or all of the structure and/or operations for the communications system 100 in a single computing entity, such as entirely within a single device 320.

The device 320 may comprise any electronic device capable of receiving, processing, and sending information for the communications system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 320 may execute processing operations or logic for the communications system 100 using a processing component 330. The processing component 330 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 320 may execute communications operations or logic for the communications system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 320 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 320 may communicate with other devices 310, 350 over a communications media 325 using communications signals 322 via the communications component 340. In some embodiments, computing device 320 may comprise a client device used by the user of a communications system 100 and connection management application 110 to perform network tasks (such as web browsing, reading email, or any other network or Internet based task). Devices 310 and 350 may comprise one or more servers with which the user is communicating over media 325 using signals 322 in order to carry out these network tasks. Processing component 330 may, therefore, be operative to carry out the functions of the previously-described communications component 122, traffic analysis component 124, logging component 126, and network control component 128. Signals 322 sent over media 325 may therefore comprise one or more connections 130 subject to the management, analysis, and potential blocking by the connection management application 110.

Figure 4:
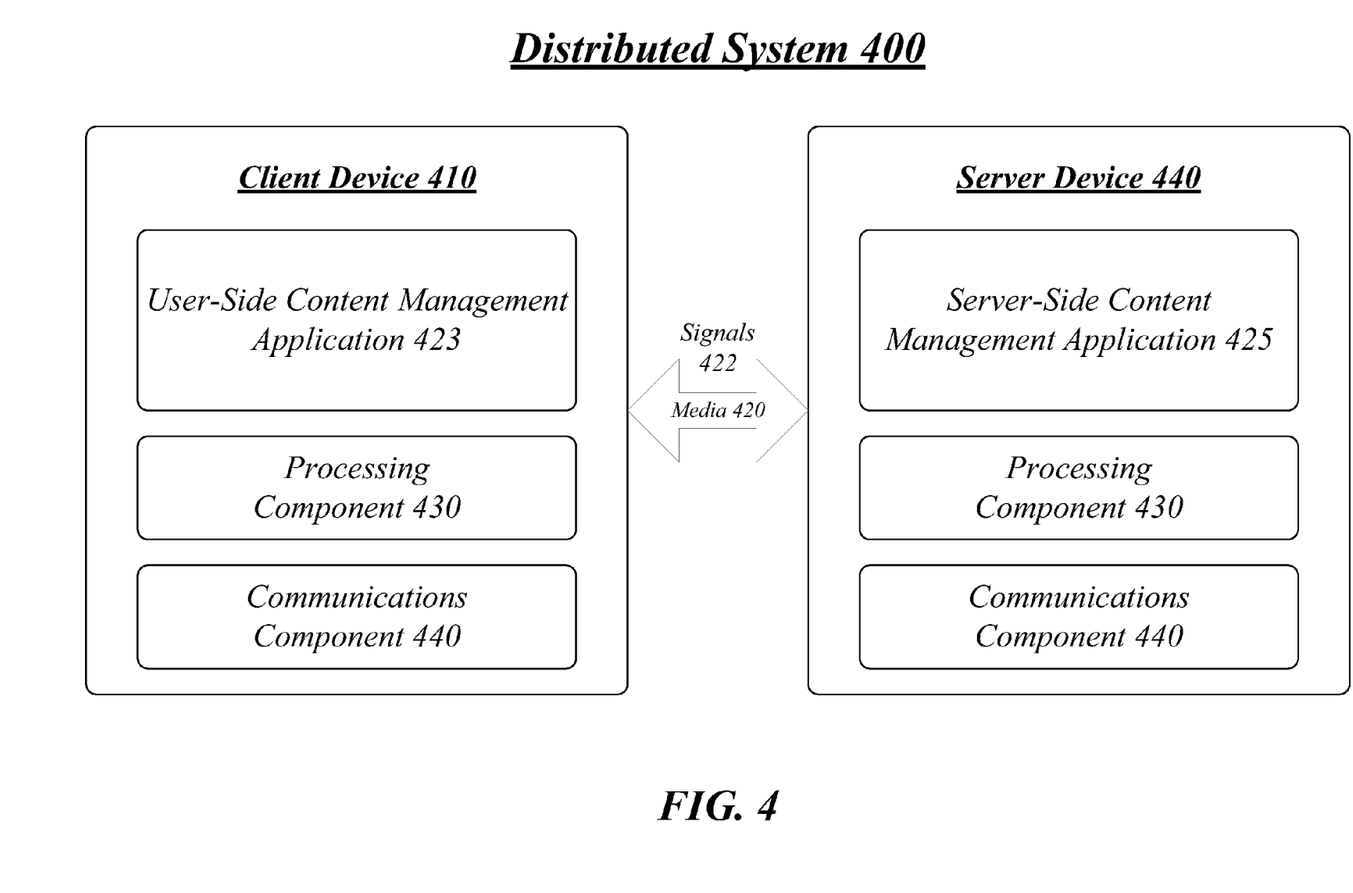
FIG. 4 illustrates an embodiment of a distributed system for the communication system of FIG. 1.

FIG. 4 illustrates a block diagram of a distributed system 400. The distributed system 400 may distribute portions of the structure and/or operations for the communications system 100 across multiple computing entities. Examples of distributed system 400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 400 may comprise a client device 410 and a server device 440. In general, the client device 410 and the server device 440 may be the same or similar to the client device 320 as described with reference to FIG. 3. For instance, the client device 410 and the server device 440 may each comprise a processing component 430 and a communications component 440 which are the same or similar to the processing component 330 and the communications component 340, respectively, as described with reference to FIG. 3. In another example, the devices 410, 440 may communicate over a communications media 420 using communications signals 422 via the communications components 440.

The client device 410 may comprise or employ one or more client programs that operate to perform various methodologies in accordance with the described embodiments. In one embodiment, for example, the client device 410 may implement a user-side content management application 423 which comprises user-side functionality of a communication system 100. For example, the user-side content management application 423 may be operative to present a user with information—such as determined characteristics—and query a user as to whether a connection should be blocked.

The server device 440 may comprise or employ one or more server programs that operate to perform various methodologies in accordance with the described embodiments. In one embodiment, for example, the server device 440 may implement a server-side content management application 425 which works in unison with the user-side content management application 423 to perform the tasks of the communication system 100 including the connection management application 110. In some embodiments, each of the communications component 122, the traffic analysis component 124, the logging component 126, and the network control component 128 may be implemented by the server-side content management application 425. As such, the signals 422 sent over media 420 may comprise data and control signals sent between the user-side content management application 423 and the server-side content management application 425 such that the user of the client device 410 may presented with relevant data—such as the determined characteristics—and receive and respond to queries as to whether a connection should be blocked. In some embodiments, the server device 440 may comprise one or more servers as part of a cloud computing system, such that the cloud computing system provides proxy and connection management services for the client device 410.

Figure 5:
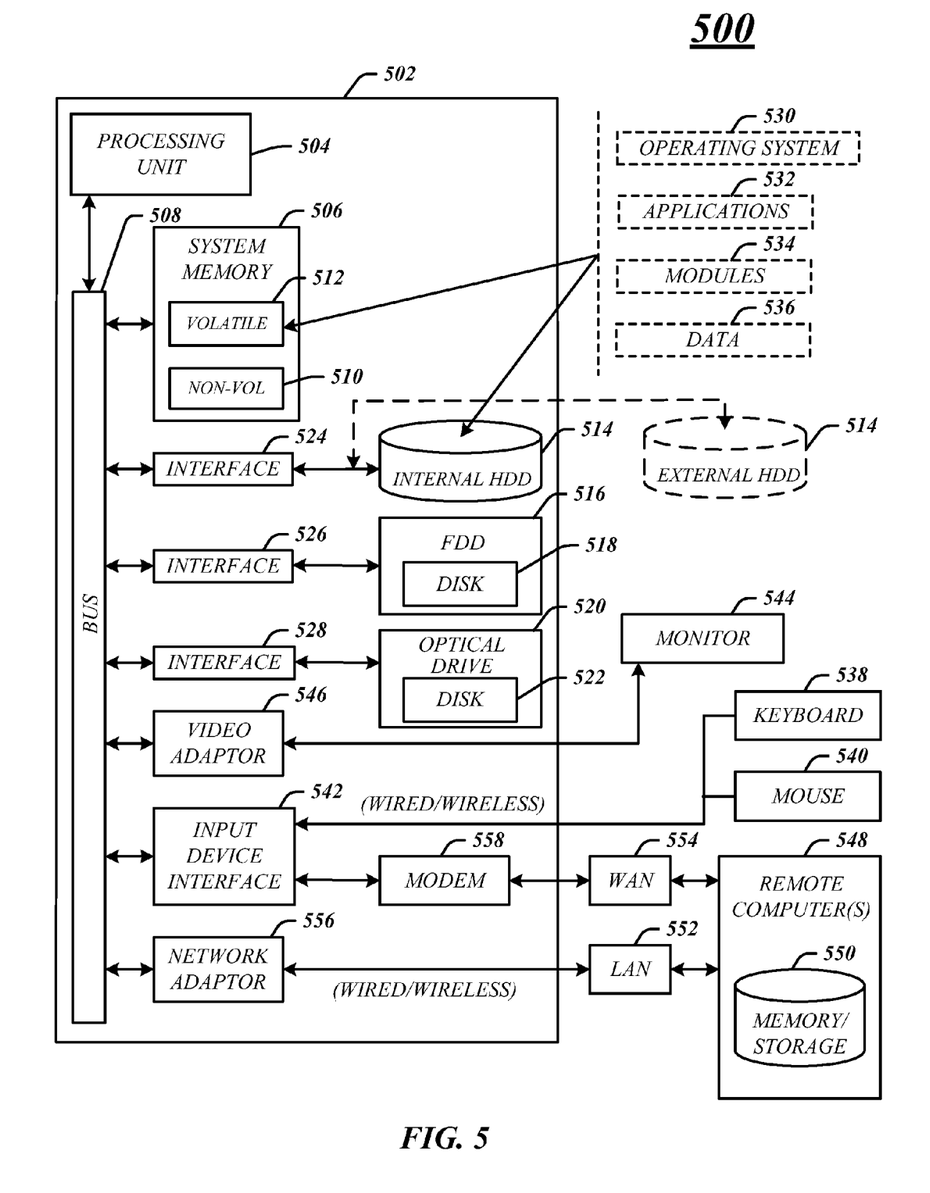
FIG. 5 illustrates an embodiment of a computing architecture.

FIG. 5 illustrates an embodiment of an exemplary computing architecture 500 suitable for implementing various embodiments as previously described. In one embodiment, the computing architecture 500 may comprise or be implemented as part of an electronic device. Examples of an electronic device may include those described with reference to FIG. 3 and FIG. 4, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 504.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the communications system 100.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 6:
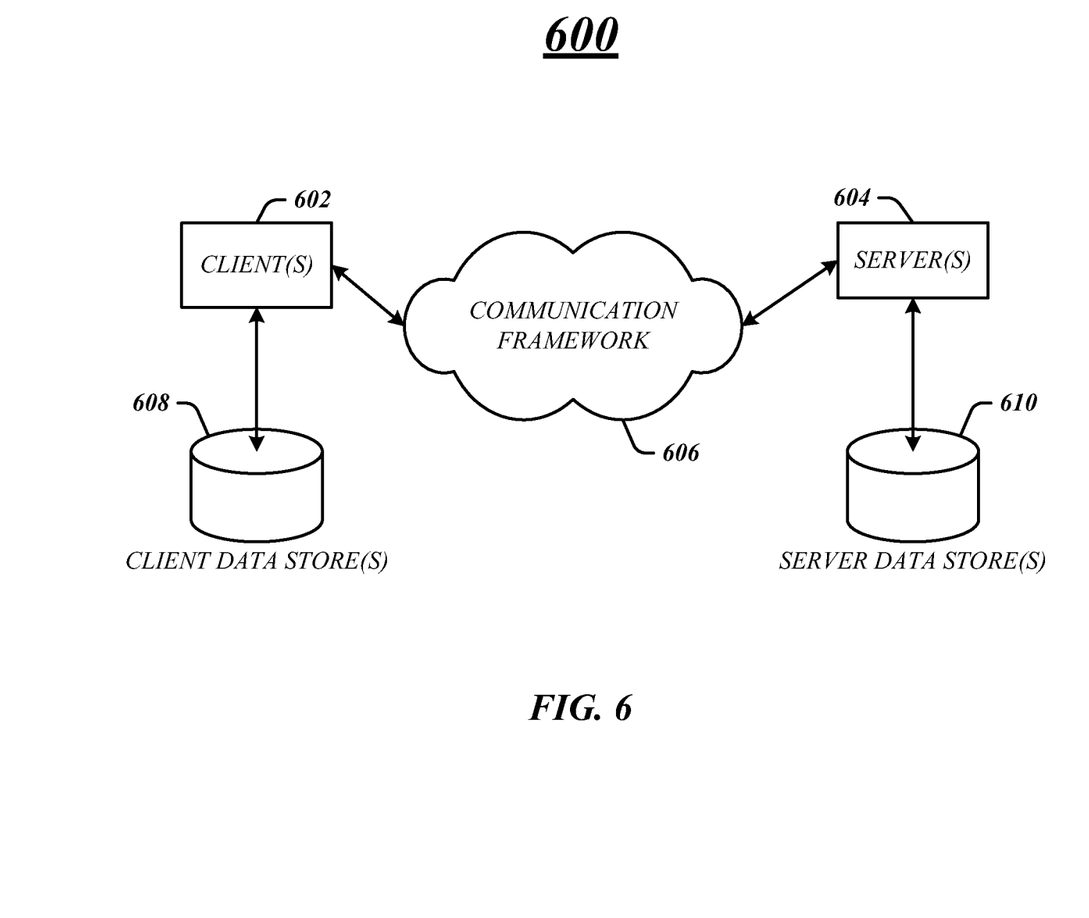
FIG. 6 illustrates an embodiment of a communications architecture.

FIG. 6 illustrates a block diagram of an exemplary communications architecture 600 suitable for implementing various embodiments as previously described. The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600.

As shown in FIG. 6, the communications architecture 600 comprises includes one or more clients 602 and servers 604. The clients 602 may implement the client device 410. The servers 604 may implement the server device 440. The clients 602 and the servers 604 are operatively connected to one or more respective client data stores 608 and server data stores 610 that can be employed to store information local to the respective clients 602 and servers 604, such as cookies and/or associated contextual information.

The clients 602 and the servers 604 may communicate information between each other using a communication framework 606. The communications framework 606 may implement any well-known communications techniques and protocols. The communications framework 606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 602 and the servers 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

In one example, an apparatus may comprise a processor circuit, a communications component operative on the processor circuit to manage a connection for a client, the connection routed over a network, and a traffic analysis component operative to determine one or more characteristics of the routing of the connection.

In another example, the apparatus may additionally or alternatively comprise a logging component operative to create a record in a log of network traffic of the one or more characteristics.

In another example, the apparatus may additionally or alternatively comprise where determining the one or more characteristics comprises performing an encrypted exchange with a plurality of routing points of the routing of the connection, the encrypted exchanges comprising public-key based verification of identifying information of the plurality of routing points, determining whether to block the connection comprising blocking the connection when any of the routing points are not securely verified.

In another example, the apparatus may additionally or alternatively comprise the connection being automatically allowed without user input if each step of the routing of the connection appears on a whitelist.

In another example, the apparatus may additionally or alternatively comprise the user being queried to approve or block the connection if at least one step of the routing of the connection does not appear on a whitelist.

In another example, the apparatus may additionally or alternatively comprise the communications component operative to specify in an outgoing transmission one or more of a blacklist, whitelist, and preference list for the routing of the connection.

In another example, the apparatus may additionally or alternatively comprise the traffic analysis component operative to verify each step of the routing of the connection using one or more queries to a secure path domain name server.

In another example, the apparatus may additionally or alternatively comprise displaying a standardized icon to a user only when a verified connection path has been established for a connection.

In another example, the communications component may additionally or alternatively comprise a cloud server acting as a network proxy for the client.

In another example, determining the one or more characteristics may additionally or alternatively comprise one or more of determining the routing points of the connection, a domain name server lookup of a source of the connection, and a type of data carried by the connection.

In another example, the apparatus may additionally or alternatively comprise the one or more determined characteristics comprising a physical location of any routing points of the routing of the connection.

In another example, the apparatus may additionally or alternatively comprise the communications component operative on the processor circuit to specify one or more of a whitelist, blacklist, and preference list in a header of a network protocol message, the one or more of the whitelist, blacklist, and preference list specifying region-based rules for the routing of the connection.

In another example, the apparatus may additionally or alternatively comprise determining the one or more characteristics comprising retrieving a cryptographically secure mapping list, the mapping list comprising a map between IP addresses and regions.

In another example, the apparatus may additionally or alternatively comprise the connection initiated by a source and the determined physical location comprising GPS coordinates of the source of the connection.

In another example, the apparatus may additionally or alternatively comprise the connection to be blocked if the determined physical location is part of a set of blacklisted physical locations.

In another example, the apparatus may additionally or alternatively comprise a network control component operative to determine whether to block the connection based on the one or more determined characteristics.

In another example, the apparatus may additionally or alternatively comprise the connection to be blocked if the determined characteristics indicate that the connection was routed through a region included in a set of blacklisted regions, the traffic analysis component operative on the processor circuit to re-check the connection at intervals according to the blacklist.

In one example, a computer-implemented method may comprise managing a connection for a client, the connection routed over a network, determining one or more characteristics of the routing of the connection, and determining whether to block the connection based on the one or more determined characteristics.

In another example, the computer-implemented method may additionally or alternatively comprise where determining the one or more characteristics comprises performing an encrypted exchange with a plurality of routing points of the routing of the connection, the encrypted exchanges comprising public-key based verification of identifying information of the plurality of routing points.

In another example, the computer-implemented method may additionally or alternatively comprise the connection being automatically allowed without user input if each step of the routing of the connection appears on a whitelist.

In another example, the computer-implemented method may additionally or alternatively comprise the user being queried to approve or block the connection if at least one step of the routing of the connection does not appear on a whitelist.

In another example, the computer-implemented method may additionally or alternatively comprise specifying in an outgoing transmission one or more of a blacklist, whitelist, and preference list for the routing of the connection.

In another example, the computer-implemented method may additionally or alternatively comprise verifying each step of the routing of the connection using one or more queries to a secure path domain name server.

In another example, the computer-implemented method may additionally or alternatively comprise displaying a standardized icon to a user only when a verified connection path has been established for a connection.

In another example, the computer-implemented method may additionally or alternatively comprise determining the one or more characteristics of the routing of the connection comprising one or more of determining the routing points of the connection, running a domain name server lookup of a source of the connection, and determining a type of data carried by the connection.

In another example, the computer-implemented method may additionally or alternatively comprise the one or more determined characteristics comprising a physical location.

In another example, the computer-implemented method may additionally or alternatively comprise blocking the connection if the determined physical location is part of a set of blacklisted physical locations.

In another example, the computer-implemented method may additionally or alternatively comprise blocking the connection if the determined characteristics indicate that the connection was routed through a region included in a set of blacklisted regions.

In one example, at least one computer-readable storage medium may comprise a plurality of instructions that in response to being executed on a computing device cause the computing device to carry out any of the described methods.

In one example, an apparatus may comprise means for performing any of the described methods.

In one example, a communications device may be arranged to perform any of the described methods.

In one example, a system may comprise an apparatus according to any of the described apparatuses, and a digital display communicatively coupled to the processor circuit.

In one example, a system may comprise an apparatus according to any of the described apparatuses and one or more wireless transceivers operative to enable wireless communications for the system using one or more wireless communication protocols.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processor circuit;
   a communications component operative on the processor circuit to manage a connection for a client, the connection routed over a network;
   a traffic analysis component operative to determine one or more characteristics of the routing of the connection based, at least in part, on performing an encrypted exchange with a plurality of routing points of the connection, the encrypted exchanges including public-key based verification of identifying information of the plurality of routing points, the one or more determined characteristics comprising a physical location of any routing points of the routing of the connection; and a network control component operative to present a user with one or more of the determined one or more characteristics and to query the user as to whether to block the connection.

2. The apparatus of claim 1, the communications component comprising a cloud server acting as a network proxy for the client.

3. The apparatus of claim 1, the traffic component to determine the one or more characteristics further comprises one or more of determining the routing points of the connection, a domain name server lookup of a source of the connection, and a type of data carried by the connection.

4. The apparatus of claim 1, the communications component operative on the processor circuit to specify one or more of a whitelist, blacklist, and preference list in a header of a network protocol message, the one or more of the whitelist, blacklist, and preference list specifying region-based rules for the routing of the connection.

5. The apparatus of claim 1, the traffic component to determine the one or more characteristics further comprises retrieving a cryptographically secure mapping list, the mapping list comprising a map between network addresses and regions.

6. The apparatus of claim 1, comprising:
the network control component operative to determine whether to block the connection based on the one or more determined characteristics.

7. The apparatus of claim 1, the connection to be blocked if the determined characteristics indicate that the connection was routed through a region included in a set of blacklisted regions, the traffic analysis component operative on the processor circuit to re-check the connection at intervals according to the blacklist.

8. The apparatus of claim 1, comprising:
the network control component operative to present the user with one or more of the determined one or more characteristics and to query the user as to whether to allow the connection.

9. A computer-implemented method, comprising:
managing a connection for a client, the connection routed over a network;
determining, by a processor circuit, one or more characteristics of the routing of the connection based, at least in part, on performing an encrypted exchange with a plurality of routing points of the connection, the encrypted exchanges including public-key based verification of identifying information of the plurality of routing points, the one or more determined characteristics comprising a physical location of any routing points of the routing of the connection; and
determining whether to block the connection based on the one or more determined characteristics.

10. The computer-implemented method of claim 9, determining the one or more characteristics of the routing of the connection further comprises one or more of determining the routing points of the connection, running a domain name server lookup of a source of the connection, and determining a type of data carried by the connection.

11. The computer-implemented method of claim 9, comprising:
blocking the connection if the determined physical location of any routing points of the routing of the connection is part of a set of blacklisted physical locations.

12. The computer-implemented method of claim 9, determining whether to block the connection further comprises blocking the connection when any of the routing points are not securely verified.

13. The computer-implemented method of claim 9, comprising:
blocking the connection if the determined characteristics indicate that the connection was routed through a region included in a set of blacklisted regions.

14. At least one non-transitory computer-readable storage medium comprising a plurality of instructions that in response to being executed on a computing device cause the computing device to:
manage a connection for a client, the connection routed over a network;
determine one or more characteristics of the routing of the connection based, at least in part, on performing an encrypted exchange with a plurality of routing points of the connection, the encrypted exchanges including public-key based verification of identifying information of the plurality of routing points, the one or more determined characteristics comprising a physical location of any routing points of the routing of the connection; and
determine whether to block the connection based on the one or more determined characteristics.

15. The at least one non-transitory computer-readable storage medium of claim 14, the computing device caused to determine one or more characteristics of the routing of the connection further comprises to determine the routing points of the connection.

16. The at least non-transitory one computer-readable storage medium of claim 14, the computing device caused to determine one or more characteristics of the routing of the connection further comprises to run a domain name server lookup of a source of the connection.

17. The at least one non-transitory computer-readable storage medium of claim 14, the computing device caused to determine one or more characteristics of the routing of the connection further comprises to determine a type of data carried by the connection.

18. The at least one non-transitory computer-readable storage medium of claim 14, the computing device caused to block the connection if the determined physical location of any routing points of the routing of the connection is part of a set of blacklisted physical locations.

19. The at least one non-transitory computer-readable storage medium of claim 14, the computing device caused to:
determine whether to block the connection further comprises blocking the connection when any of the routing points are not securely verified.

20. The at least one non-transitory computer-readable storage medium of claim 14, the computing device caused to block the connection if the determined characteristics indicate that the connection was routed through a region included in a set of blacklisted regions.

* * * * *